United States Patent [19]

Komerath et al.

[11] Patent Number: 5,249,238
[45] Date of Patent: Sep. 28, 1993

[54] SPATIAL CROSS-CORRELATING VELOCIMETER

[76] Inventors: Narayanan M. Komerath, 3341 H, Country Club Village, Norcross, Ga. 30092; Philip A. Fawcett, 1451 - F, Druid Valley Dr., Atlanta, Ga. 30329

[21] Appl. No.: 671,529
[22] Filed: Mar. 19, 1991
[51] Int. Cl.$^5$ .............................................. G06K 9/00
[52] U.S. Cl. ............................................ 382/1; 382/42; 73/861.06
[58] Field of Search .................... 382/42, 23, 17, 1; 73/861.06

[56] References Cited

U.S. PATENT DOCUMENTS

| | | | |
|---|---|---|---|
| 4,019,038 | 4/1977 | Critten et al. | 73/861.06 |
| 4,248,085 | 2/1981 | Coulthard | 73/861.06 |
| 4,257,275 | 3/1981 | Kurita et al. | 73/861.06 |
| 4,598,593 | 7/1986 | Sheen et al. | 73/861.06 |
| 4,604,904 | 8/1986 | Massen | 73/861.06 |
| 4,707,130 | 11/1987 | Hofmann et al. | 73/861.06 |
| 4,729,109 | 3/1988 | Adrian et al. | 73/861.06 |
| 4,733,962 | 3/1988 | Brendemuehl | 73/861.06 |
| 4,752,727 | 6/1988 | Schneider | 73/861.06 |
| 4,859,055 | 8/1989 | Gal et al. | 73/861.06 |
| 4,866,639 | 9/1989 | Adrian | 73/861.06 |
| 4,912,519 | 3/1990 | Yoshida et al. | 73/861.06 |
| 4,976,154 | 12/1990 | Schneider et al. | 73/861.06 |
| 4,980,922 | 12/1990 | Leib | 382/42 |
| 5,011,273 | 4/1991 | Farrell | 73/861.06 |
| 5,029,481 | 7/1991 | Keech | 73/861.06 |

OTHER PUBLICATIONS

Lakshmurarasimha, A. Tabakoff, W. Metwally, A., "LDV Measurements in the Vortex Region of a Radial Inflow Turbine", AIAA Paper 89-1823, Jun. 12-14, 1989.

Komerath, N. M. et al, "The Velocity Field of a Lifting Model Rotor Blade in Hover", Mar. 1988, pp. 250-257, *Journal of Aircraft*.

Bachalo, W. D. et al, "Phase/Doppler Spray Analyzer for Simultaneous Measurements of Drop Size & Velocity Distributions", *Optical Engineering*, vol. 23, No. 5, Sep./Oct. 1984, pp. 583-590.

Hiller, B. et al, "Laser-Induced Fluorescence Technique for Velocity Field Measurements in Subsonic Gas Flows", Optics Letters, 8(9) 474-476, 1983.

Hiller, B. et al, "Simultaneous Measurements of Velocity & Pressure Fields in Subsonic and Supersonic Flows Through Image-Intensified Detection of Laser-Induced Fluorescence", AIAA Paper 86-0161, AIAA 24th Aerospace Science Meeting, Reno, Nev., Jan. 1986.

Miles, J., Rayleigh Scattering.

Meynart, R., "Digital Image Processing for Speckle Flow Velocimetry", Review of Scientific Instruments, 53(1), Jan. 1982, pp. 110-111.

Smith, C. A., Lourenco, L. M. M. et al., "The Develop- (List continued on next page.)

*Primary Examiner*—Michael T. Razavi
*Assistant Examiner*—Yon Jung
*Attorney, Agent, or Firm*—Hopkins & Thomas

[57] ABSTRACT

This invention enables the simultaneous measurement of two components of instantaneous velocity at several points over an area in a specified cross-section of a flowing fluid or on a vibrating solid surface. It is applicable to large areas, and to situations where the measurement must be conducted from large distances. It uses digital cross-correlation, between two images taken within a short time interval, of the scattering patterns from the plane of interest. The patterns can be random, periodic, or quasi-periodic, and the individual light-scattering features of the patterns need not be resolved. The information density in the images can vary from being sparse to dense. Since high values of correlation coefficients are not required, the method survives substantial amounts of noise in the images. The method is suitable for implementation with very short facility run-times. The post-processing is fully automated and is performed using moderate computational resources. The invention consists of the concept, the method, and the present implementations of the method.

19 Claims, 18 Drawing Sheets

OTHER PUBLICATIONS ment of Laser Speckle Velocimetry for the Measurement of Vortical Flow Fields", AIAA 86-0768, Mar. 1986.

Shepherd, W. C. F., *Third Symposium on Combustion, Flame & Explosion Phenomena*, Williams & Wilkins, 1949, pp. 301-316.

Reuss, D. L. et al, "Two Dimensinal Velocity Measurements in a Laminar Flame Using Particle Image Velocimetry", *Combustion Science & Technology*, Oct. 1989, pp. 73-83.

Post, M. et al, "Comparison of Two-Color Particle Imaging Velocimetry Data & Calculated Velocity Field in a Turbine Cascade", AIAA Paper 91-0274, 29th Aerospace Sciences Meeting, Reno, Nev., Jan. 1991.

Shakarriz,, A. et al "Quantitative Visualization of Junction Vortices Using Particle Displacement Velocimetry", AIAA Paper 91-0269, 29th Aerospace Sciences Meeting, Reno, Nev., Jan. 1991.

Yao, C. S. & Adrian, R. J., "Orthogonal Compression & 1-D Analysis Technique for Measurement of 2-D Particle Displacements in Pulsed Laser Velocimetry", Applied Optics, vol. 23, 1984, pp. 1687-1689.

James, M. R., et al "A High Accuracy Automated Strain-Field Mapper", *Experimental Mechanics*, Mar. 1990, pp. 60-67.

Gonzales, R. C., "Digital Image Processing", Addison-Wesley Publishing Co., Applied Mathematics & Computation Series, No. 13, 1982, pp. 58-65.

Pierce, A. D., "Acoustics An Introduction to Its Physical Principles & Applications", McGraw-Hill, 1981, pp. 86-88.

Komerath, N. M., Fawcett, P. A., & Ballarini, D., "Planar Velocimetry Using Digital Cross-Corrrelations". Developments in Theoretical & Applied Mechanics, vol. XV, Georgia Institute of Technology, Mar. 23, 1990.

Planar Velocimetry by Spatial Cross Correlation: Theoretical Basis and Validation, N. M. Komerath, P. A. Fawcett; 21st Plasma Dynamics, Fluid Dynamics, and Lasers Conference, AIAA Paper No. 90-1634, Jun. 1990.

Spatial Correlation Velocimetry in Unsteady Flows, P. A. Fawcett, N. M. Komerath; 29th Aerospace Sciences Meeting, Jan. 1991.

Planar Velocimetry Using Digital Cross Correlations, N. M. Komerath, P. A. Fawcett, D. Ballarini; XVth Proceedings of the South Eastern Conference for Theoretical and Applied Mechanics, Mar. 23, 1990, p. 471.

SPATIAL CROSS-CORRELATING VELOCIMETER

STATEMENT OF RIGHTS

This invention was made with U.S. Government support under contract DAAL03-88-C-0003-AD2 awarded by the U.S. Army Research Office. The United States Government has certain rights in the invention.

BACKGROUND OF THE INVENTION

Field of Invention

This invention relates to the simultaneous measurement, at several points, of the velocity of flowing fluids or moving solid surfaces.

Velocity measurement in fluid flows and on deforming structures is crucial to the development of a multitude of devices, ranging from aircraft to hair dryers. Present techniques for measuring complex, time-varying velocity fields are tedious and expensive. As a result, detailed velocity measurement is virtually impractical in large wind tunnels and other test facilities. Planar velocimetry, the process where one or more components of velocity are measured simultaneously at several points in a plane, is a sought-after objective. The present invention is aimed at improving the ease, speed, and versatility of planar velocimetry in fluid flows and on solid surfaces.

Description of the Prior Art

For the reasons given above, there has been continued effort for many years directed at the objectives of this invention. This invention, for which we will use the acronym of SCV, and also the term "Spatial Correlation Velocimetry", is the result of a new approach to the problem, driven by the total lack of techniques which are suitable in practice for planar velocimetry in large wind tunnels. In the flows where SCV will find the most vital use, the flow direction will be generally unknown, and may fluctuate rapidly. Traditional methods based on intrusive probes are not applicable in such flows, and will not be considered here. Prior to SCV, there were 4 classes of methods for non-intrusive velocimetry in fluid flows. These are listed in the following:

Laser Doppler Velocimetry (LDV): The velocity is measured from the Doppler shift in laser light scattered by micron-sized "seed" particles which are introduced into the flow. The seed particles must be small and light enough to follow the most rapid flucutations in flow velocity with high fidelity. The scattering from such particles, whose sizes are comparable to the wavelength of the radiation, is called Mie scattering.

Laser-induced fluorescence (LIF): Velocity is extracted using spectroscopy from the Doppler shift in the fluorescence signal from a flow. The fluorescence is created when certain substances present in the flow are excited with tuned laser radiation.

Speckle Velocimetry: Interference fringe patterns are created by passing a coherent laser beam through two superposed transparencies of the image of a flowfield, (or a double-exposed photographic film). The multiple images must be taken within a very short interval, usually from the light scattered by a sheet of laser light from a pulsed laser. The spacing between the fringes is related to the magnitude of the displacement between the two images, while the fringe orientation is related to the direction of the displacement.

Particle Image Velocimetry (PIV): Images of individual tracers (seed particles, fluorescence, arc-heated spots, etc.) are tracked in time. This is done either by identifying specific particles in images taken within short intervals, or by measuring characteristics of particle motion such as traces left in photographs.

In LDV, the velocity must be measured at one point at a time, and the laser beams must be moved to the next point to make the next measurement. This is extremely time-consuming, prohibitively so when large, expensive wind tunnels and helicopter rotor test stands are involved. Prior art using this method is extensive, and recent examples are cited as Refs. (1) through (3).

LIF is used primarily in flames and high-speed flows. It requires exotic and usually poisonous seeding substances (e.g., iodine), and special lasers, and imaging and spectroscopic systems. Its resolution is good only in high-speed flows, where the velocity is comparable to the speed of sound. Examples are cited in Refs. (4) and (5). This method has little potential for use in large facilities. Fluorescence is much weaker than the Mie scattering used in LDV.

Ref. 6 discusses planar velocimetry at extremely high velocities using the Doppler shift in the Rayleigh scattering from certain molecules. This method requires very high flow velocities to make the Doppler shift measurable, several lasers and specialized optics and dye cells. The Rayleigh signal is much weaker than even the fluorescence signal.

Speckle Velocimetry acquires flow information using a double-exposed photograph of a densely-seeded flow illuminated with a pulsed laser. Another laser beam is then passed through transparencies of the image, one point at a time, and the light is imaged onto another screen. If the seeding density (number of light-scattering particles per unit volume) is high enough, the double-image causes interference fringes to appear on the screen. The spacing between fringes is inversely proportional to the speed; the fringe orientation is perpendicular to the direction of the velocity vector. The post-processing required for this technique is laborious. This method works only if the seeding density is extremely high in the plane of interest, but low enough elsewhere so that the flowfield does not become opaque. This is only applicable in very small flow facilities, since the area of interest cannot be seen otherwise. Refs. (7) and (8) are examples.

PIV is a subject of intensive current research, involving many researchers, and millions of research dollars per year. Here, images of the flow are taken within short intervals. The displacement of individual particles between two images is identified, one particle at a time. The particles must be quite large to be identified, the area of the image must be small, the illumination must be bright, and the receiving optics must be placed close to the plane of interest. Automation of this procedure is a difficult problem. Particles may enter or leave the object plane between images, since the optical depth of field must be small to resolve individual particles. There are several methods to extract particle velocity from image pairs. Ref. (9) related the length of traces of particles seen on photographs to velocity, but there were ambiguities. The trace of a large particle would be longer than that of a small particle for the same incident light intensity. The trace could also be short because the particle entered or left the object plane during the exposure.

Ref. (10) identified double-images of "suitable" particles in photographs, and computed the auto-correlation of the double-image of each particle. This function exhibited two peaks, whose relative displacement was a measure of velocity. This is more precise than trace measurement, but clear images of individual particles are required, and must be isolated. These authors achieved a spatial resolution on the order of 0.25 mm$^2$ on a total area of 1000 mm$^2$. The direction of motion was not uniquely resolved: the double-image cannot say which way the particle was moving. Ref. (11) proposes solutions to this problem using two lasers of different colors for the two photographic exposures. This expensive and intricate process, involving precise alignment and timing of two powerful laser sources and a high-speed framing camera, illustrates the extreme importance of developing planar velocimetry, and the trouble and expense which current researchers and their sponsors undergo in order to achieve it. Other examples of PIV are given in Refs. 12 and 13. For larger areas, this technique must use very large particles, which will not follow the motions of the fluid precisely, so that PIV will not give the velocity of the fluid flow.

Spatial cross-correlation techniques have found applications in pattern recognition, and in failure analysis. Recently, Ref. (14) has shown a method for automated stain-field mapping from electron micrographs of solid surfaces. However, these methods have found few applications in fluid mechanics or structural dynamics, where correlation functions may decay rapidly with space and time and patterns do not remain stationary. In fact, previous researchers have dismissed such methods as being inapplicable to fluid flows (see Ref. 8).

SUMMARY OF THE INVENTION

Several objectives of our invention are:

to enable and perform the simultaneous measurement of two components of the flow velocity at several points in large areas, to enable and perform the measurements described above under conditions where individual seed particles cannot be resolved or distinguished, to enable and perform the measurements described above without ambiguity regarding direction of motion, so that complex flows can be analyzed, to enable and perform the measurements described above under conditions where the light source and the receiving optics must be located at a distance greater than 1 meter from the measurement plane.

to enable and perform the measurements described above in flowfields where the seeding is no more dense than that needed for laser Doppler velocimetry, to enable and perform the measurements described above using a process which can be automated for routine operation, and to convert the problem of velocity measurement from one that is facility-intensive, (which is getting even more expensive) to one that requires minimal facility time, but moderate computational resources (which are getting cheaper and faster).

Our system performs all of the above, as demonstrated by the results shown in this application. The need for high seeding density is greatly reduced; the need to track individual particles is eliminated entirely. The statistical properties of random particle distributions are utilized, so that errors due to differences in particle size are averaged out. The direction of motion is determined without the sign ambiguity inherent in double-exposure methods. The need for expensive and laborious post-processing is eliminated, and replaced by fully-automated numerical procedures which are run at high speed on computers. In terms of information density, our method spans the domains of speckle velocimetry and PIV, and applies especially to the domain of LDV and flow visualization in large wind tunnels. This is the domain of greatest practical interest.

BRIEF DESCRIPTION OF THE DRAWINGS

In the drawings, related figures have the same number but different alphabetic suffixes.

FIGS. 1(a)–1(b): Two digitized images of the random motion of air in a room, illuminated by a copper vapor laser sheet. The image in FIG. 1b was taken 0.5 second after that in FIG. 1a.

DESCRIPTION OF THE PREFERRED EMBODIMENT

Transfer of momentum in fluids occurs primarily through large, coherent flow structures. These structures have finite lifetimes, so that there must be some degree of correlation between the features of two images taken within a time interval which is shorter than the integral time scale of the local motion. The desired end result is an accurate, quantitative representation of the velocity vector at as many points as possible in the area of interest. The differences between the two images would be caused by the following:

a) convection of features by the mean fluid motion,
b) exchange of fluid across the illuminated region, c) distortion of the flow structures by shear and dilatation, d) noise in the image acquisition and processing.

The problem is to determine the direction and magnitude of (a), and the detailed velocity distribution from (c), despite the errors and noise caused by (b) and (d). If (a) overwhelms the other effects, the displacements of given features of the image can be easily measured at a few points, averaged, and converted to velocity using the known time difference between the two images. When effects (b), (c), and (d) are present, this must be performed statistically, using information from every element of the two images. This is achieved by spatial cross-correlation.

To obtain an image, the flow is "seeded" with particles which scatter light. Alternatively, in some flows, the motion of density gradients or concentration gradients can be detected. As seen from FIG. 1, one needs to distinguish only the patterns formed by large numbers of particles, not the individual particles themselves, to discern fluid motion. Also, the patterns can be statistically random. In fact, the more random they are, the easier it is to obtain and interpret the results.

Figure 1A:

Consider a cross-section A of a flowfield, shown in FIG. 1(a), illuminated with intensity $I_1(x,y)$ of light or other electromagnetic radiation. We assume, for simplicity, that the light-scattering particles respond instantaneously to changes in the flow, so that the velocity of a scattering particle is essentially equal to the fluid velocity in its immediate vicinity. This is also assumed in all the other velocimetry methods, with varying degrees of error. Neglecting variations in particle size (justifiable if statistical properties are used), the scattered intensity $I_2(x,y,t)$ is:

$$I_2(x,y,t) = D(x,y,t) * I_1(x,y) \quad (1)$$

where $D(x,y,t)$ is a function which includes the seeding density and the optical properties of the seed particles at (x,y) at time t. The detector is configured such that the spatial and temporal distributions in intensity of scattered radiation $I_2(x,y)$ arriving from area A are recorded with a gain function $G(x,y)$. We assume that the frequency response of the detector is uniform over the area A, and is high enough to be considered infinite for typical time scales of applications. Thus the detector output $I_3(x,y,t)$ is $$I_3(x,y,t) = G(x,y) * I_2(x,y,t) \quad (2)$$

Figure 1B:
Figure 2:
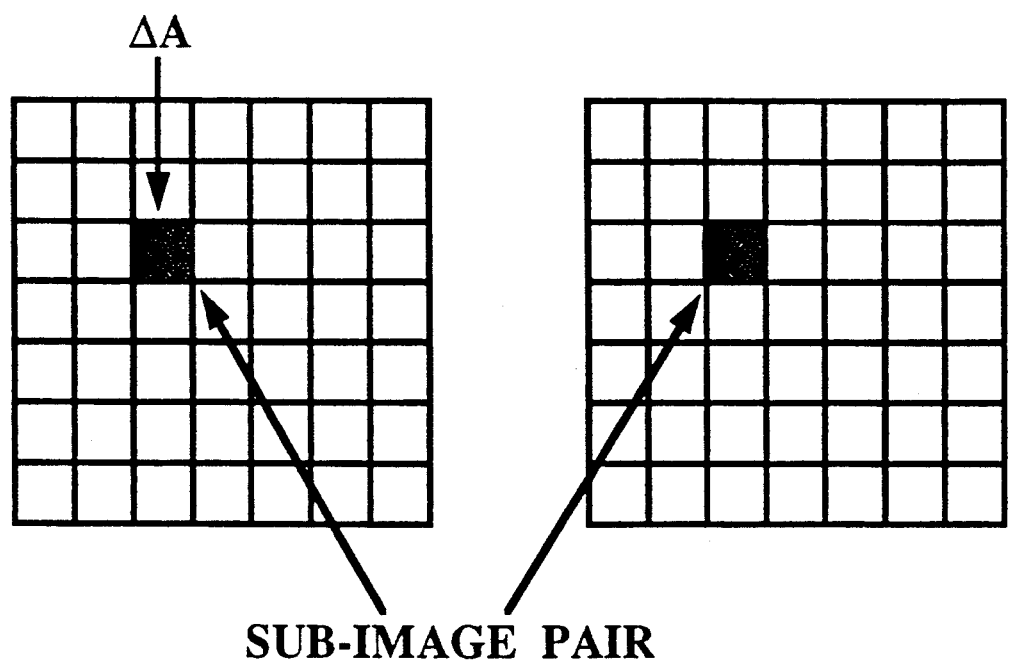
FIGS. 2(a)–2(b): a) Subimages of a pair of digitized image arrays b) Spatial cross-correlation function for a sub-image pair, showing shift of the peak from (0,0). This function was computed from two arrays of random numbers, the second generated by shifting the first. After shifting, uncorrelated random numbers were added to each array to simulate noise.

Using an M-bit image digitization system, this distribution is digitized at time t into a finite number of possible levels of intensity (2**M−1) at each of a finite number of spatial locations (pixels). At time $t+\Delta t$, another image of A, as shown in FIG. 1(b), is digitized. Thus, we now have the 2-dimensional numerical arrays $F_1(nx,ny)$, and $F_2(nx,ny)$ representing intensity distributions at times t and $t+\Delta t$. Consider corresponding subsets f1 and f2 of these arrays, that contain digitized intensity values from a region of the flowfield which corresponds to a selected area $\Delta A$ in A. This is shown in FIG. 2(a).

Figure 2B:
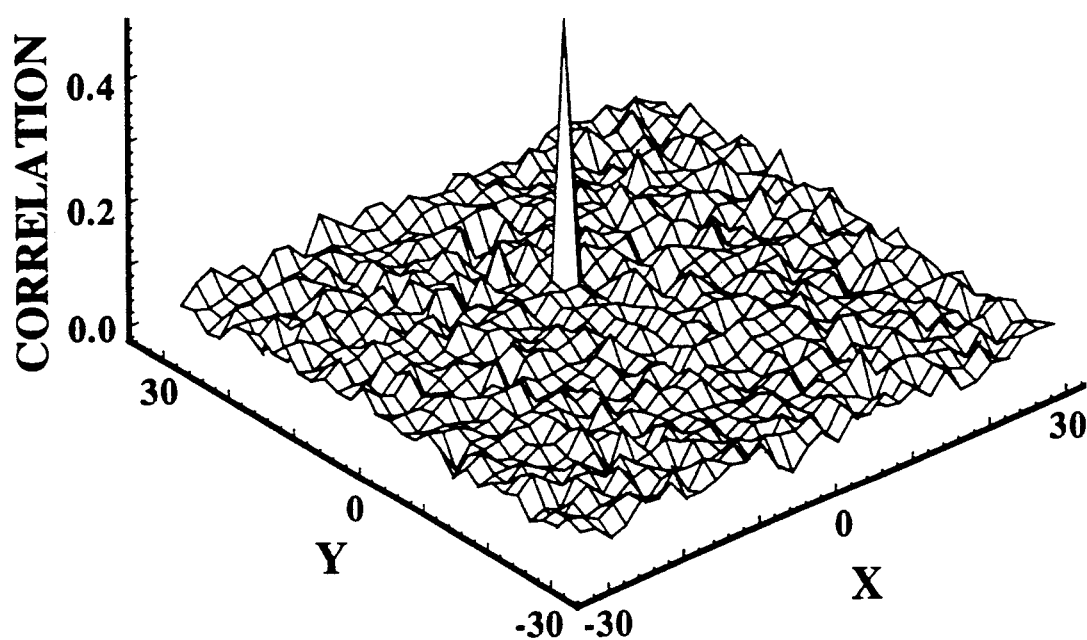

5.1 Spatial Cross-Correlation Function:

The spatial cross-correlation function $R_{12}(\partial x, \partial y)$ of these two arrays is as given in Ref. 15:

$$R_{12}(\partial x, \partial y) = \Sigma\Sigma f1(nx,ny) f2(nx+\partial x, ny+\partial y) i\partial x j dy \quad (3)$$

and is illustrated in FIG. 2(b). When f1 and f2 are both random distributions, the cross-correlation has a single, sharp, clearly-defined peak. When f1 and f2 are exactly the same, and $\Delta t$ is zero, the function reduces to the autocorrelation function, whose peak value occurs in the pixel corresponding to $(\partial x, \partial y) = (0,0)$. When f1 and f2 are "very similar", but f2 corresponds to f1, shifted in space by a finite number of pixels (i,j), the peak occurs in the pixel corresponding to (i,j). Using the optical system parameters, this shift can be converted to a shift $(\Delta X, \Delta Y)$ in the flowfield. The velocity vector V in the interval t to $t+\Delta t$, averaged over area $\Delta A$, is $$V = (\Delta Xx + \Delta Yy)/\Delta t \quad (4)$$

where x and y are unit vectors along X and Y respectively. Repeating the procedure, one velocity vector can thus be found for each $\Delta A$ in A, and a vector plot of the velocity field in A in the time interval t to $t+\Delta t$ can be obtained from just the two images. If $\Delta t$ is small, the result is the velocity field at time $t+0.5\Delta t$.

Direct computation of 2-dimensional cross-correlations of large arrays is prohibitively expensive. The computation time can be vastely reduced using the 2-dimensional analogue of the Wiener-Khintchine theorem (Ref. 16) relating cross-correlations and cross-spectra through Fourier transforms. From Ref. (15):

$$R(x,y) <==> F1(u,v)F2^*(u,v) \quad (5)$$

Figure 3:
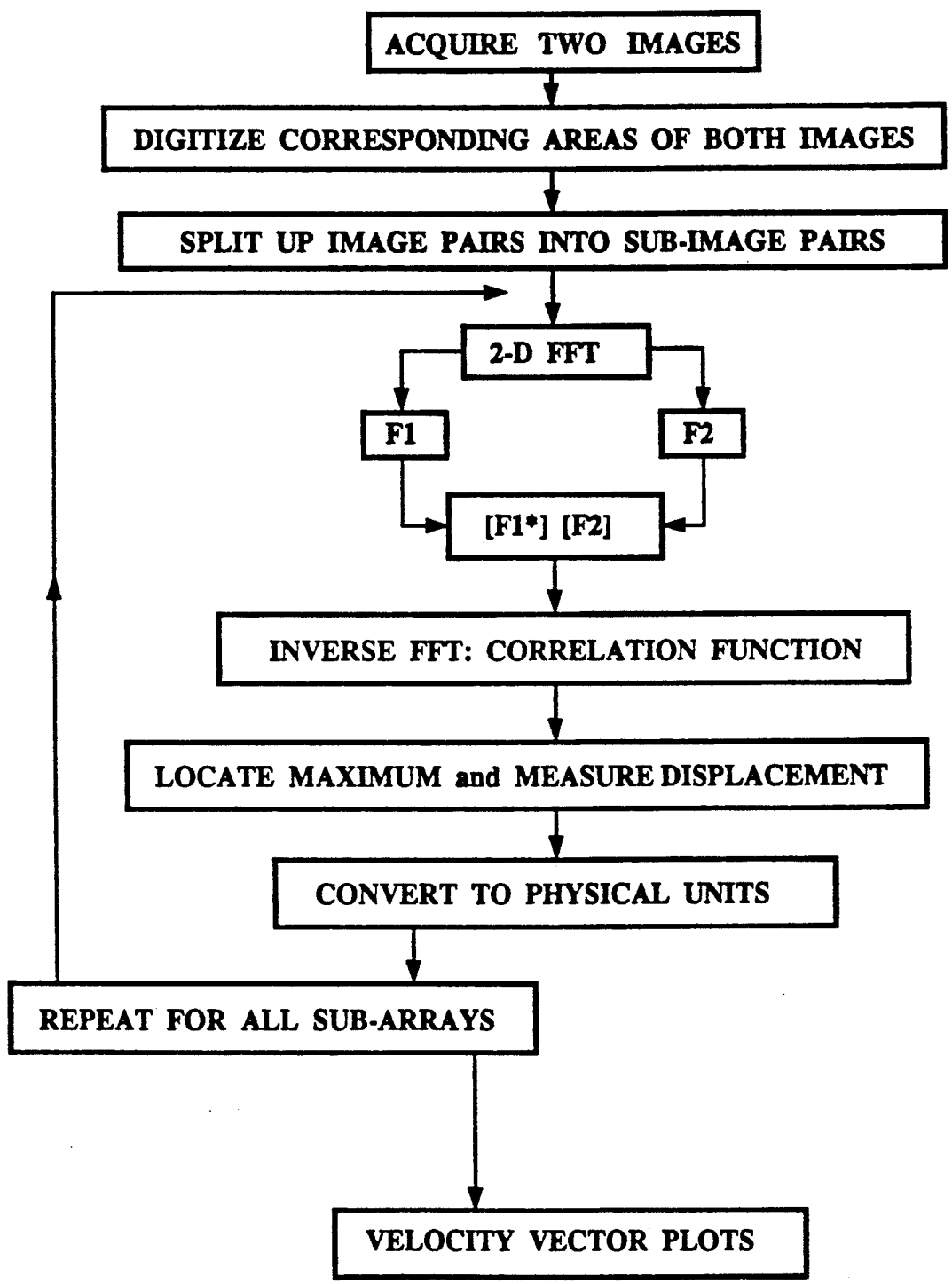
FIG. 3: Flow Chart of the Spatial Cross-Correlation Velocimeter method.
Figure 4A:
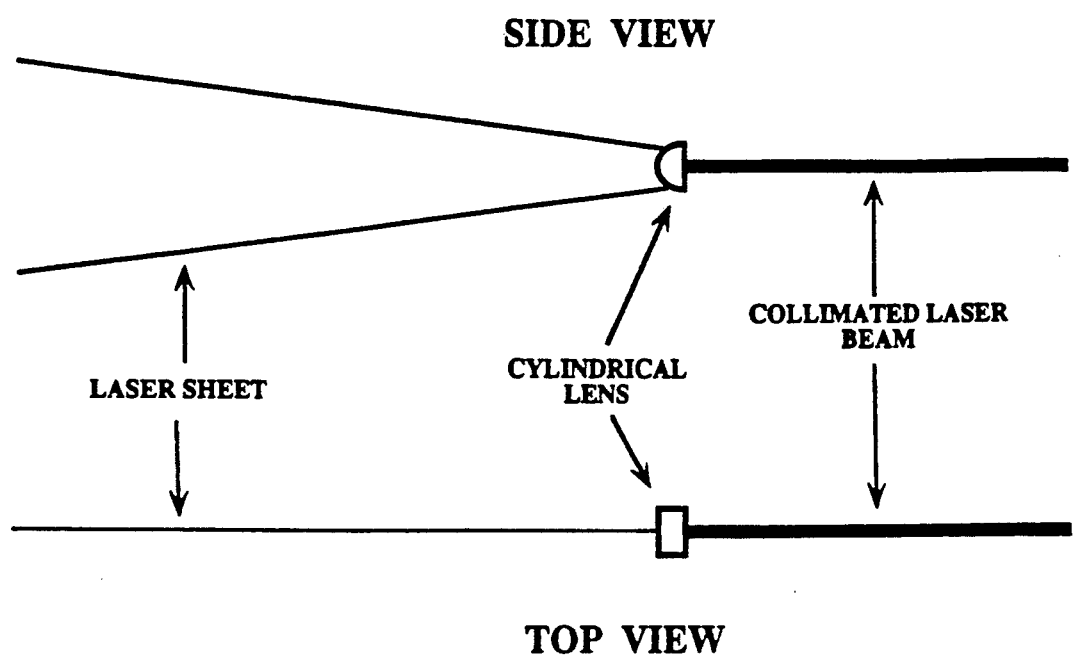
FIGS. 4(a)–4(b): Creation of light sheet from (a) a laser source and (b) from a non-laser source.
Figure 4:
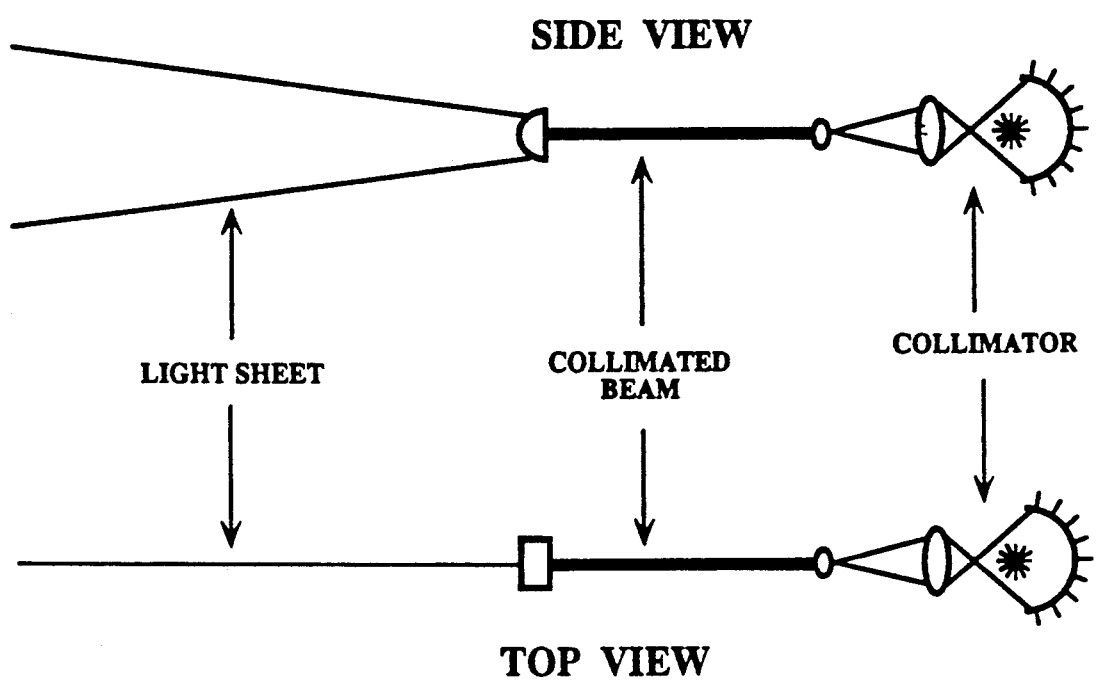

Here, u and v are transform variables, F1 and F2 are the Fourier transforms of f1 and f2 respectively, and the * denotes the complex conjugate of the transform. The operator $<==>$ denotes the 2-dimensional Fourier transform, which can be taken in either direction. Thus, the cross-correlation computation can be replaced by two forward Fourier transforms, an array multiplication in the complex domain, and a single inverse Fourier transform. The transforms are efficiently implemented by a Fast Fourier Transform (FFT) algorithm. Thus, the velocity measurement procedure is reduced to that summarized in FIG. 3. FFT computation time increases non-linearly with the array size used. We get one velocity vector for each small area $\Delta A$ digitized.

The invention is the Spatial Cross-Correlation Velocimeter. Its elements are described below:

Light sheet: In our present implementation, we generate a light sheet from a laser, or other light source. As shown in FIG. (4), the light is focused to its smallest dimensions, and then collimated for minimum divergence. The light beam is then passed through a cylindrical lens in order to expand it into a sheet. One advantage of SCV is that the light sheet need not be thin, unlike in the PIV techniques, since we do not seek to capture individual particle image Because of this simplification, lasers are not essential: any bright source can be used. On solid or liquid surfaces, SCV needs only ambient light, or ordinary lamps for diffuse illumination. These are major advantages over other planar velocimetry techniques, which invariably require very expensive and specialized lasers and precisely-controlled light sheet dimensions.

Light scattering mechanism

Some form of seeding or other optical heterogeneity is required in order to scatter light from the flow (i.e., to "see" the flow). The seeding may be naturally present, or artificially introduced. In cold gas flows, we use atomized mineral oil or water droplets dispersed in the flow, as a "fog". On liquid surfaces, sprinkled dust serves the purpose. In high temperature gas flows, powdered Aluminum Oxide or Titanium dioxide are usually used for laser velocimetry, and this suffices here as well. In some flows which are predominantly two-dimensional, refractive index gradients caused by density or concentration changes can be imaged. This can also serve as the light scattering mechanism. The new features of SCV as opposed to previous methods are: (a) that we can use very small seed particles, which will follow rapid fluctuations in flow velocity, without needing to resolve individual particles in images; (b) particle sizes can be non-uniform, since each sub-image correlation averages the motion of a large number of particles, instead of one particle at a time, (c) the seeding density can be low to moderate, since we do not seek to create fringe patterns using the scattered light, and (d) the seeding patterns can be random, periodic, or quasi-periodic: the cross-correlation shift from any of these can be used to measure velocity.

Imaging system

We have used several alternatives. We have used a single video camera and video recorder to capture and record the images. Alternatively, we have used a high-speed motion picture camera, at upto 2,000 frames per second, to capture and record images in rapid succession on photographic film. We then projected the developed film, frame by frame, on a screen, and recorded each frame for about 30 seconds using the video camera and recorder. More recently, we have used a video camcorder with a high-speed electronic shutter (1/4000 second) to capture images, each of which captures the illumination from only one pulse of a copper vapor laser. Here, the temporal resolution of each image is just 25 nanoseconds, the duration of a laser pulse. This has been done from a distance of over 1.5 meters from the laser sheet. No special optics, beyond those available in mail-order stores, have been used in any of these applications. Again, this is an advantage over other competing techniques: since individual particles need not be resolved, the image resolution can be such that large areas can be observed, from large distances.

Image digitization

The information from a videocamera or videotape is digitized using a video digitizing board and stored in the memory of other storage medium of a computer. The information comprises the signal levels corresponding to the red, green and blue (RGB) color components of the image at each of the picture element (pixel) locations of the digitizing board. Typically, the TrueCapture324 TM board, a product of RasterOps Corporation of Sunnyvale, Calif., converts each video frame to the RGB components of the video signal at each of $1024 \times 512$ pixels. It represents the information on each color component using 8 bits. Alternatively, monochromatic images could be used, with the intensity at each pixel represented by several bits of information. Typically, such an image occupies anywhere from 100 Kilobytes to 1.2 Megabytes of information, depending on the size in pixels of the image and the number of bits per pixel. This information is typically stored on the hard disc of a Macintosh II TM computer, a product of Apple Computer Corporation of Cupertino, Calif.

Formation of sub-image pairs:

We divide each image into $N \times M$ sub-images, where each sub-image is a square array with array dimension being a power of two. Array dimensions which are not powers of two can also be used with different algorithms, without changing the basic features of the invention. Also, N need not equal M. Typical array dimensions are $64 \times 64$. Arrays of size $16 \times 16$, $32 \times 32$, and $128 \times 128$ have also been tested, and there is no theoretical reason why larger values cannot be used. In practice, the computation time increases rapidly with array size. Array sizes smaller than $16 \times 16$ are undesirable, since the smallest measurable shift would be $\frac{1}{8}$ of the maximum value of shift in each dimension. This would make the shift measurements too imprecise.

Pixel Interpolation

At this stage, pixel interpolation can improve the spatial resolution of the technique. Sub-images of array size $16 \times 16$, for example, can first be created. Interpolation gives intermediate values between pixels, so that the sub-array size can be boosted to $64 \times 64$. Other combinations of values can be used too: the optimum depends on the particular measurement situation.

Computation of the Cross-Correlation Function

Each pair of corresponding sub-images is used to compute the cross-correlation function. The digital approximation of this function is given in Equation (3). In the present implementation, the cross-correlation is computed using the flowchart depicted in FIG. (3). The forward two-dimensional FFT is applied to each of the sub-arrays in the pair. The resulting arrays are then conjugate-multiplied, and the reverse-FFT of the result is taken. This is the required cross-correlation function. The FFT operations are performed using standard algorithms which are well-known in the signal processing literature. Other variations of the transform operation are anticipated; the choice of transform and algorithm generally depends on the computer.

Identification of the Peak of the Cross-Correlation

Figure 14:
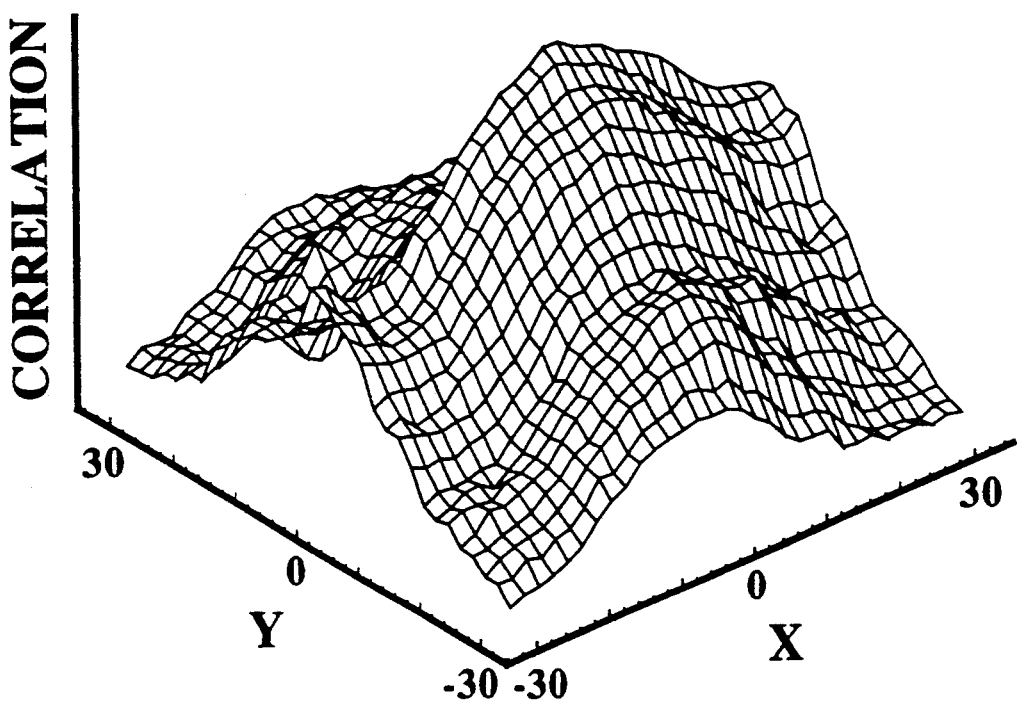
FIG. 14: Spatial cross-correlation between sub-images with quasi-periodic intensity distributions.

The cross-correlation function generally has only one extremum. For the types of images used here, the extremum is positive, and hence is a maximum. The "sharpness" of this maximum depends on the randomness of the data in the images: the more random the data, the sharper the correlation peak. In other words, this says that since the patterns are random, we see no correlation unless one image is moved to lie exactly over the other. Determination of the maximum of the correlation function yields the peak value and its location. This is accomplished in the present implementation by a simple bubble-sort algorithm. Other algorithms might increase the efficiency of this operation without changing the basic concepts. The peak in FIG. 2(b) shows the correlation between two arrays of random numbers, where the second array is generated by shifting the first by several pixels in each direction and adding more random numbers to fill in the gaps left by the shifting. The correlation peak is sharp. In fact, some uncorrelated random noise has been added to each array before performing the correlation, as discussed later. A different type of correlation is shown in FIG. 14, where there is substantial correlation away from the primary peak. This occurs when there is some degree of spatial periodicity in the data, and features of the patterns repeat in several regions of the image. This is typical of densely-seeded flows.

Occurrence of Negative Peaks

It is possible that the image pair is obtained from two distinct states of a pulsing light source. In this event, the correlation peak may be negative. The method is unaffected: determination of the extremum, in this case negative, still gives the correct shift.

Measurement of the Shift of the Peak

From FIG. (2b), the peak of the cross-correlation would occur at the location (0,0) if there is no correlated displacement between the patterns in the two sub-images. If there is a displacement, then the location ($\Delta x$, $\Delta y$) of the peak gives the statistically-averaged displacement between the patterns. This is measured in units of pixels of the array.

Phase-shift Technique for Determining Peak

Sometimes the images contain patterns which repeat periodically. In this case, there may be excellent correlation over most of the image array, and no sharp peak may be visible. Here, the maximum can be determined by a simple phase-matching algorithm. In fact, this would permit shift determination with much higher accuracy than by measuring integer numbers of pixels, since there is now much more correlated information which can be used in determining the shift.

Improvement of estimate of velocity: Moving window

The division of the original images array into sub-arrays can be performed in a multitude of different ways. The final velocity results should not be affected by this choice. This fact is used in the moving-window procedure. The size, shape, and orientation of the sub-image array are kept fixed, but the origin is successively shifted by some chosen number of pixels, say 10 in each direction, in each sub-array of the image pair. The correlation is recomputed for each new sub-image pair. A displacement vector is computed for each sub-array pair. At the end, the vectors originating within each of the original sub-arrays are averaged. This gives a stable average value of the displacement within each sub-image.

Conversion to velocity units

The displacement vector in each sub-image extends from the (0,0) location to the location of the cross-correlation peak. This vector is converted to velocity by converting it to physical dimensions, and then dividing the value by the time between the two images. The conversion to physical units is performed by measuring the size, in pixels, of an object of known dimensions, located in the plane of the measurement. This is done conveniently before or after the data recording for the velocity measurement, as long as the optical parameters are not changed. We typically use a large poster-board with a 25 mm square grid marked on the surface in thick lines.

Phase-averaging:

When the flowfield or structure is known to be periodic, the accuracy of the velocity vectors can be increased greatly by averaging vectors determined in the same phase interval, over many cycles of the periodic phenomenon. This is useful when measuring velocity near a rotating helicopter rotor blade, or a turbine blade. The instant of velocity measurement is related to the phase of the blade motion. When the same phase occurs again, with the next blade passage, the velocity field is again the same. After a large number of such measurements have been made, all of the data collected within each phase interval are averaged to give accurate results for the velocity field at that phase value. With this feature, the time required to accurately measure the complex velocity field of a rotor can be reduced from months, with LDV, to just minutes or even seconds.

OPERATION

Several test cases and implementations of the invention are documented below:

Harmonic pattern

We tested the SCV technique using two arrays obtained using a harmonic series of numbers. The second "image" was generated by phase-shifting the series used as the first "image". The phase shift in the cross-correlation matched the input phase shift, as documented in Ref. 17.

Random pattern

We next used a set of random numbers. We generated a second set of numbers by shifting the first set in both dimensions. Thus, several numbers left the array. New random numbers were added on to fill the empty locations. The resulting cross-correlation is shown in Ref. 17.

Effect of Noise

Figure 5:
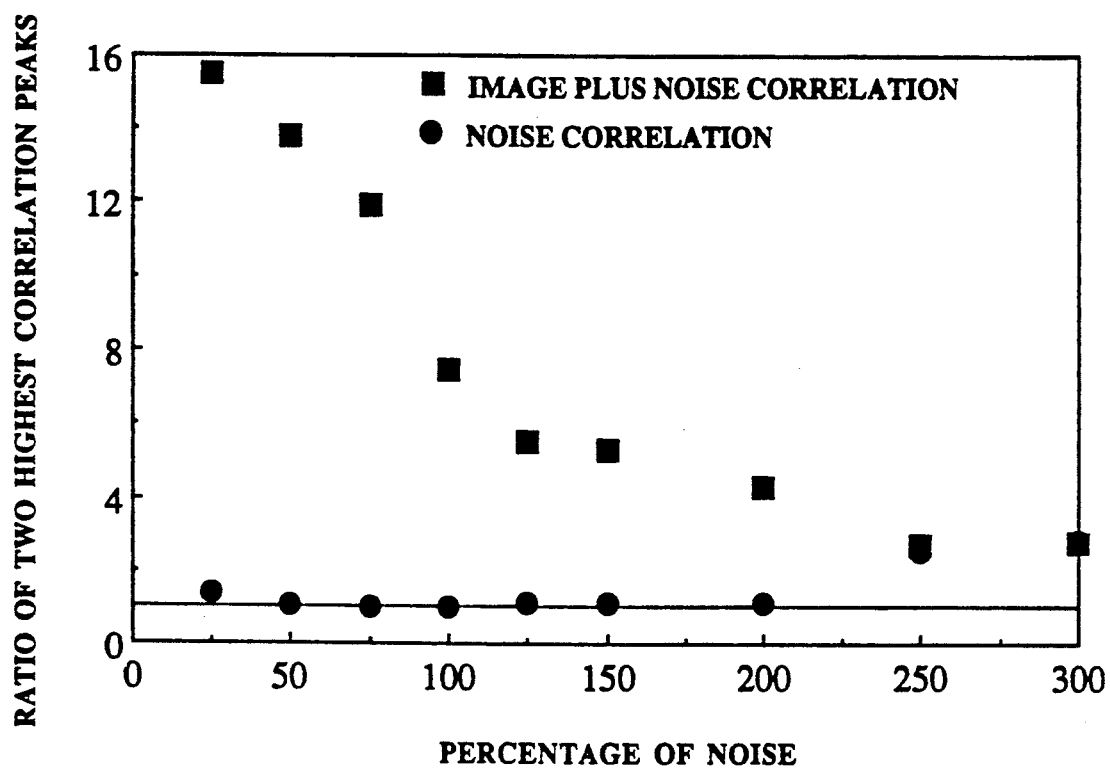
FIG. 5: The effect of noise on the determination of the correlation peak between two shifted arrays of a random number set. The ordinate is the amplitude of the second-highest peak in the correlation, as a percentage of the highest. The abcissa is the amplitude of uncorrelated noise as a percentage of the amplitude of the shifted random set.

We tested the effects of uncorrelated noise on our ability to measure the peak of the cross-correlation. FIG. 2(b) shows a cross-correlation function between two arrays where a substantial amount of uncorrelated noise has been added to each image. The peak is again easily identified, and gives the correct displacement. FIG. 5 shows that a very high level of noise can be present before the location of the peak becomes ambiguous, i.e., the next highest peak becomes almost as high as the primary peak.

Implementation of SCV to measure in-plane displacement of a solid surface

Figure 6:
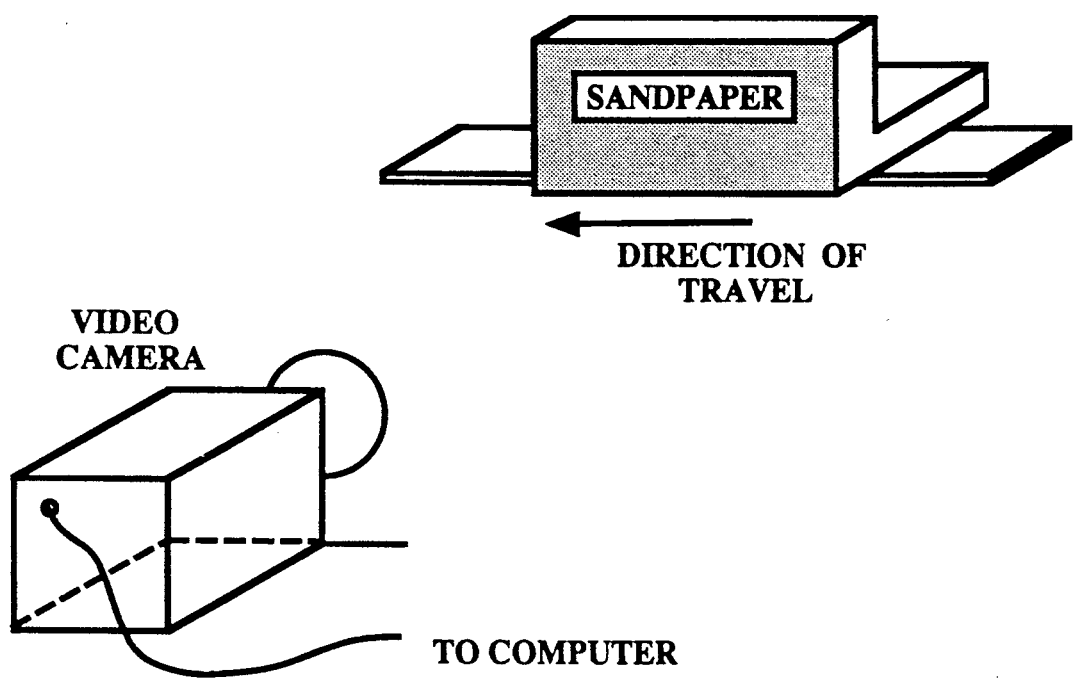
FIG. 6: Arrangement used in implementation of the SCV method to measure the displacement of a solid surface with sandpaper attached to it.
Figure 7:
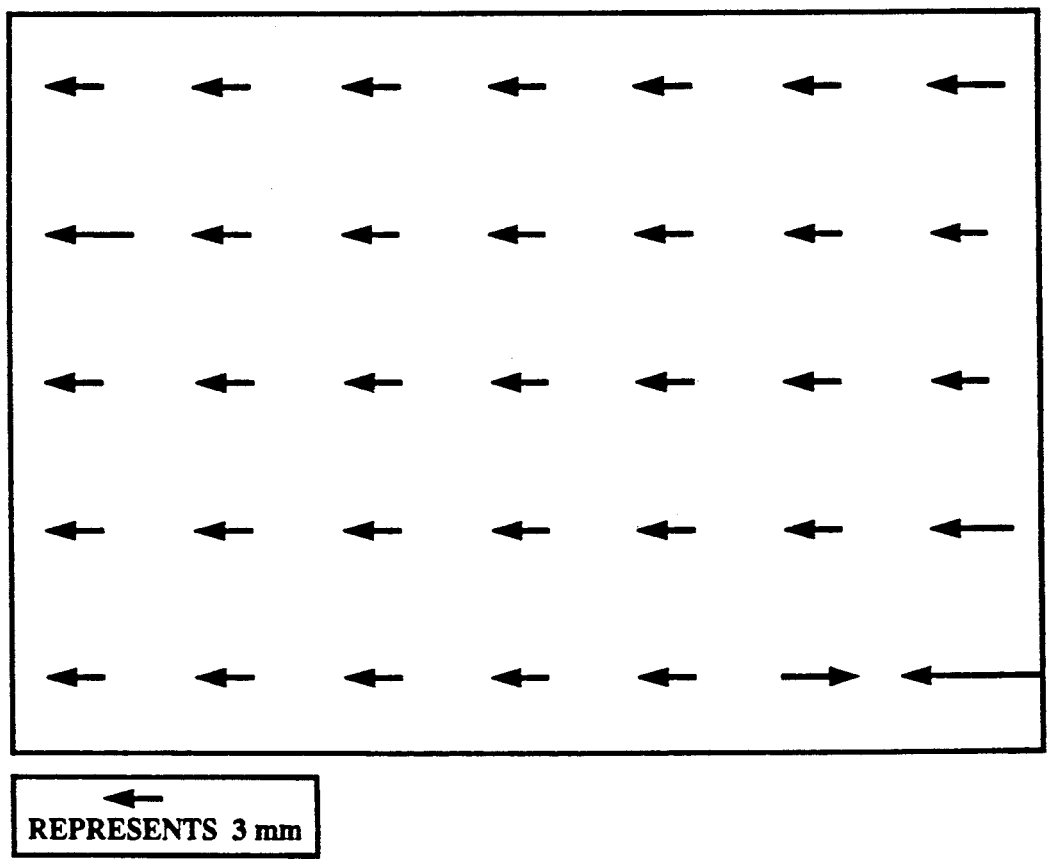
FIG. 7: 7×5 vector plot showing the displacement of the solid surface.
Figure 8:
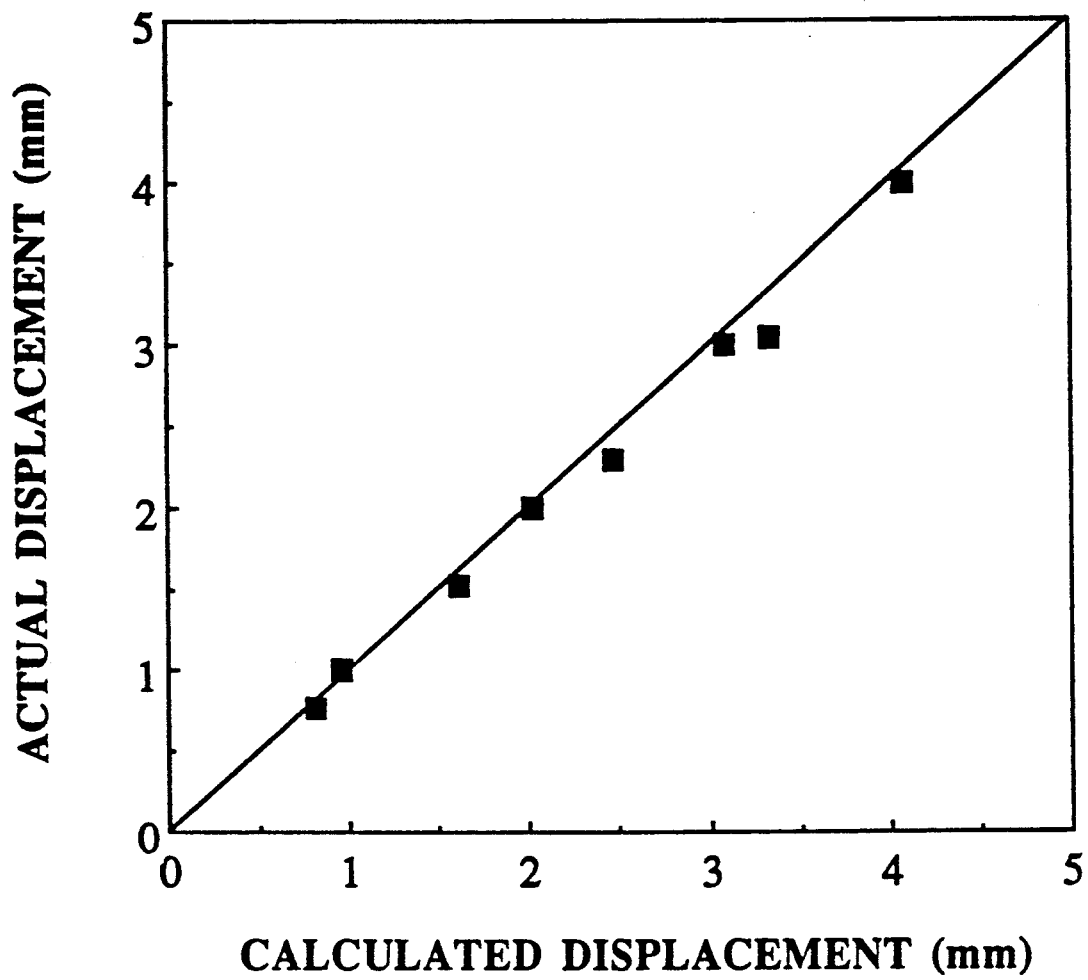
FIG. 8: Measured versus actual values of displacement of the solid surface.

The arrangement is shown in FIG. 6. Medium-grit sandpaper was pasted on a metal block to provide a random pattern. The block was moved in steps of 1 mm using a lead-screw. Images from the video camera were digitized into 512×448 arrays with 8-bit Red-Green-Blue resolution. The color values were converted to numbers using a software color look-up table. Each sub-image had dimensions of 64×64, and results from 7×5 arrays of sub-images were analyzed. FIG. 7 shows results for an image pair where actual displacement was 3 mm, which translated to a pixel displacement of 15. All 35 sub-image pairs should have given the same result; all except two did. The erroneous results are due to difficulty in determining the peak of the cross-correlation in these two sub-images. For smaller displacements, all 35 vectors were identical. FIG. 8 shows excellent agreement between the measured and actual values of displacement over a range of displacements.

Thus, small displacements can be measured with good spatial resolution. The resolution can be improved by two orders of magnitude using photographic film to record the initial images, and then videotaping these images, a small portion at a time, for digitization. At the other extreme, by changing optical parameters (zoom out the camera lens) large areas can be covered, and large displacements can be measured. This test was performed under normal fluorescent room lighting.

Implementation of SCV to measure flow on a liquid surface

The technique measures "instantaneous" velocity at several points in a plane. Thus, even in statistically stationary flows (where statistics don't change with time), the data will appear to be more random than those measured with point-wise techniques, which must average measurements over relatively large times. To perform a fair calibration, we used a water table and generated a slow, steady, uniform, laminar flow field where the velocity could be measured independently. A video camera was mounted directly above the surface. Chalk dust was used to seed the water. We measured the velocity of individual chalk particles independently between video frames, using a stopwatch display on the screen. Optical parameters were calibrated by floating a plastic scale through the field of view. Successive frames (1/30 second apart) were digitized and used to determine velocity using SCV. The measured velocity field proved to be correct.

Separated Flow Over an Airfoil in a Liquid

Figure 9:
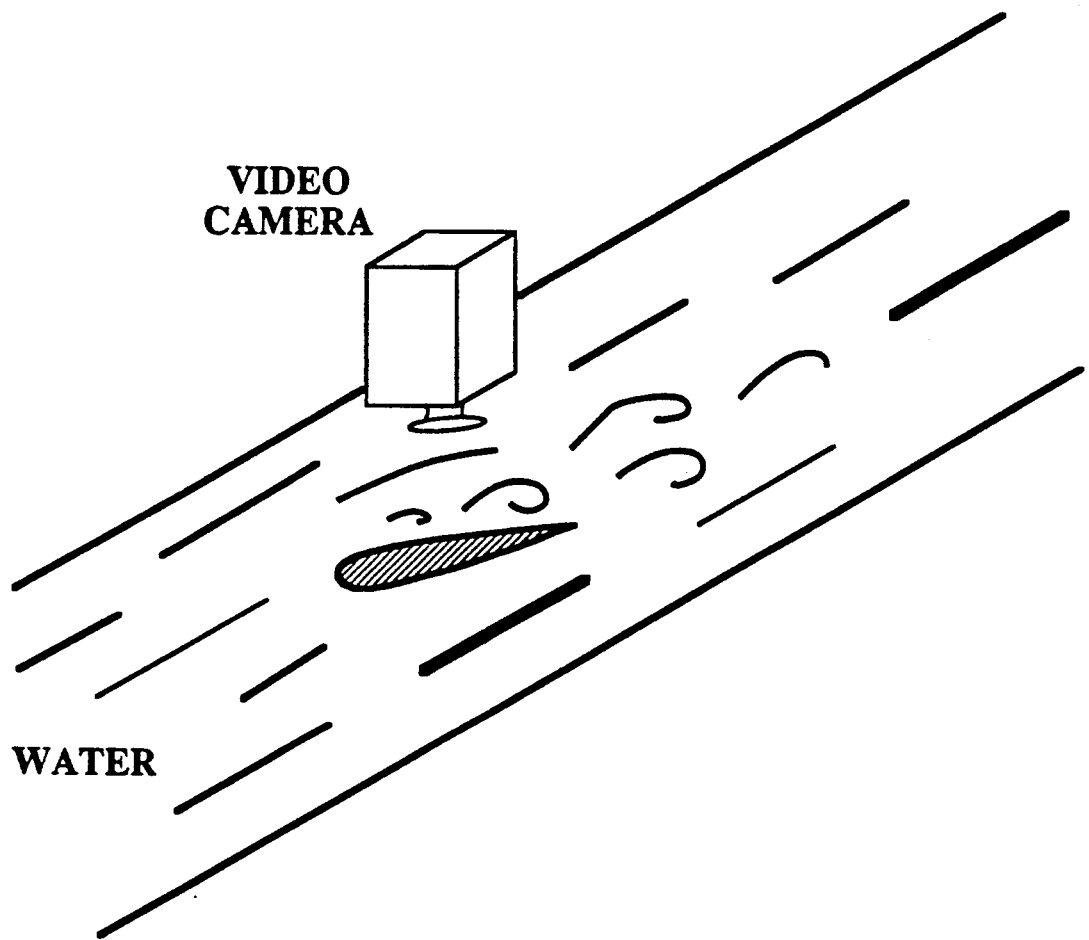
FIG. 9: Arrangement used to implement the SCV method to measure the surface velocity of water around an airfoil placed at high angle of attack.
Figure 10:
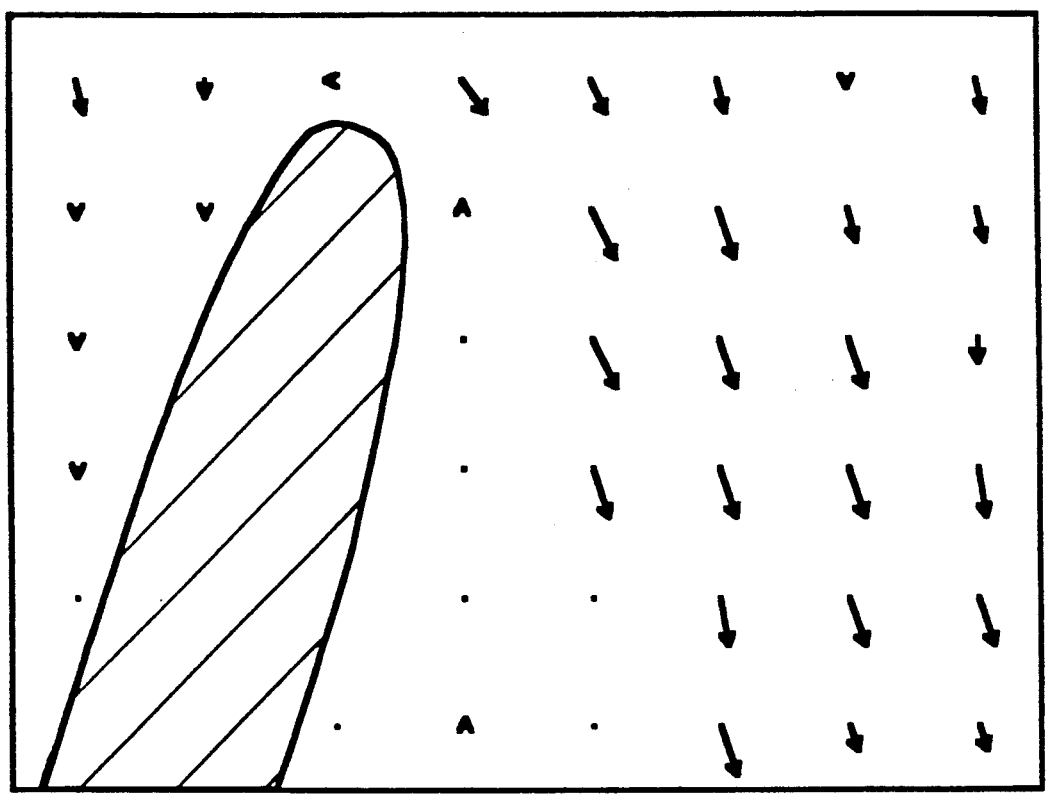
FIG. 10: Vector plot of separated flow over the airfoil.

FIG. 9 shows the experimental arrangement. FIG. 10 shows the velocity vector plot, obtained around an airfoil placed at high angle of attack in the water table. The flow reversal, the stagnant flow in the separated region, and the acceleration over the top surface are all captured.

Unsteady Flow Behind a Cylinder in a Liquid

Figure 11:
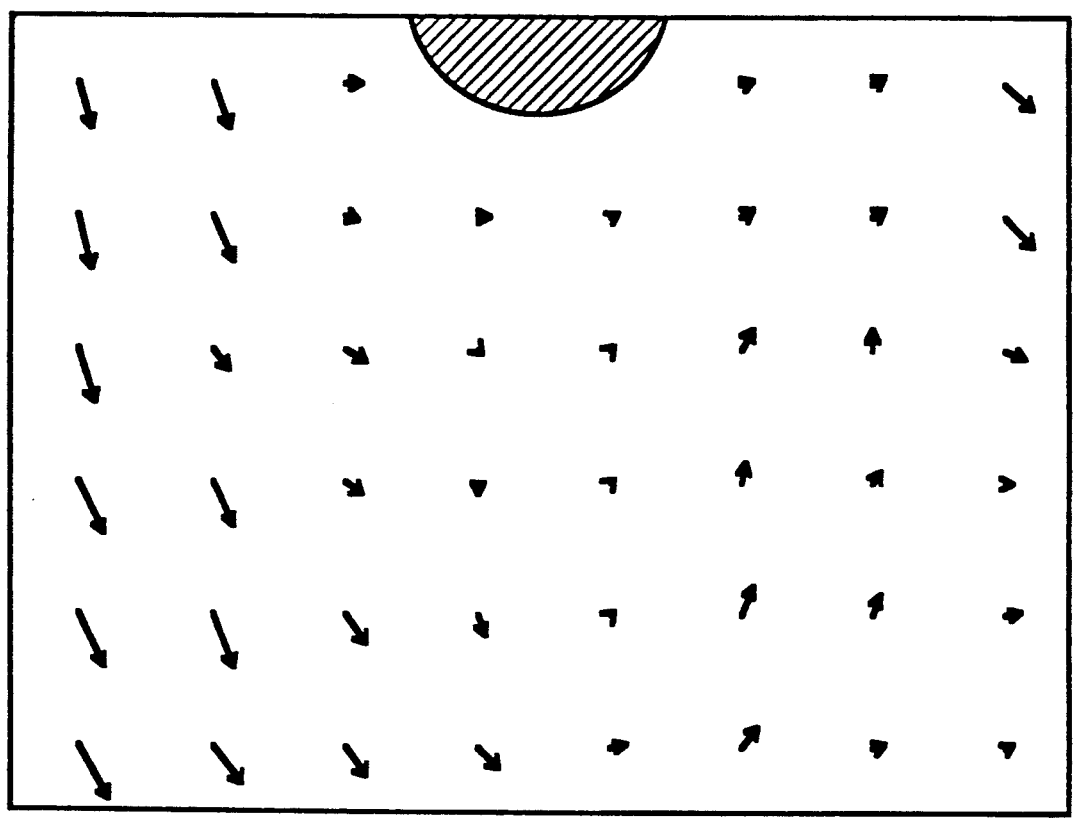
FIG. 11: Vector plot of instantaneous water surface velocity behind a circular cylinder.

FIG. 11 shows instantaneous velocity vectors obtained in the wake of a cylinder in the same water table. The actual area covered by the plot is 114×90 mm. At the instant pictured, the freestream flow is moving from top to bottom. This is a demonstration of an unsteady flow capture using SCV. Note that the dimensions of the flowfield, and the complexity of the flow directions, already far exceed those given as the current state of the art of PIV techniques in Ref. 10, and discussed in Section 1.3

Implementation of SCV in a buoyant jet of seeded air

We used incense smoke rising through a grid to create a vertical plume of turbulent smoke. We illuminated a vertical section using a copper vapor laser sheet. We subjected the results to the moving-window averaging procedure described in Section 7.3 to get the averaged flow field. The results, as expected, showed the vertical velocity of the jet.

Implementation of SCV in a large wind tunnel with air flow

Experimental arrangement

Figure 12:
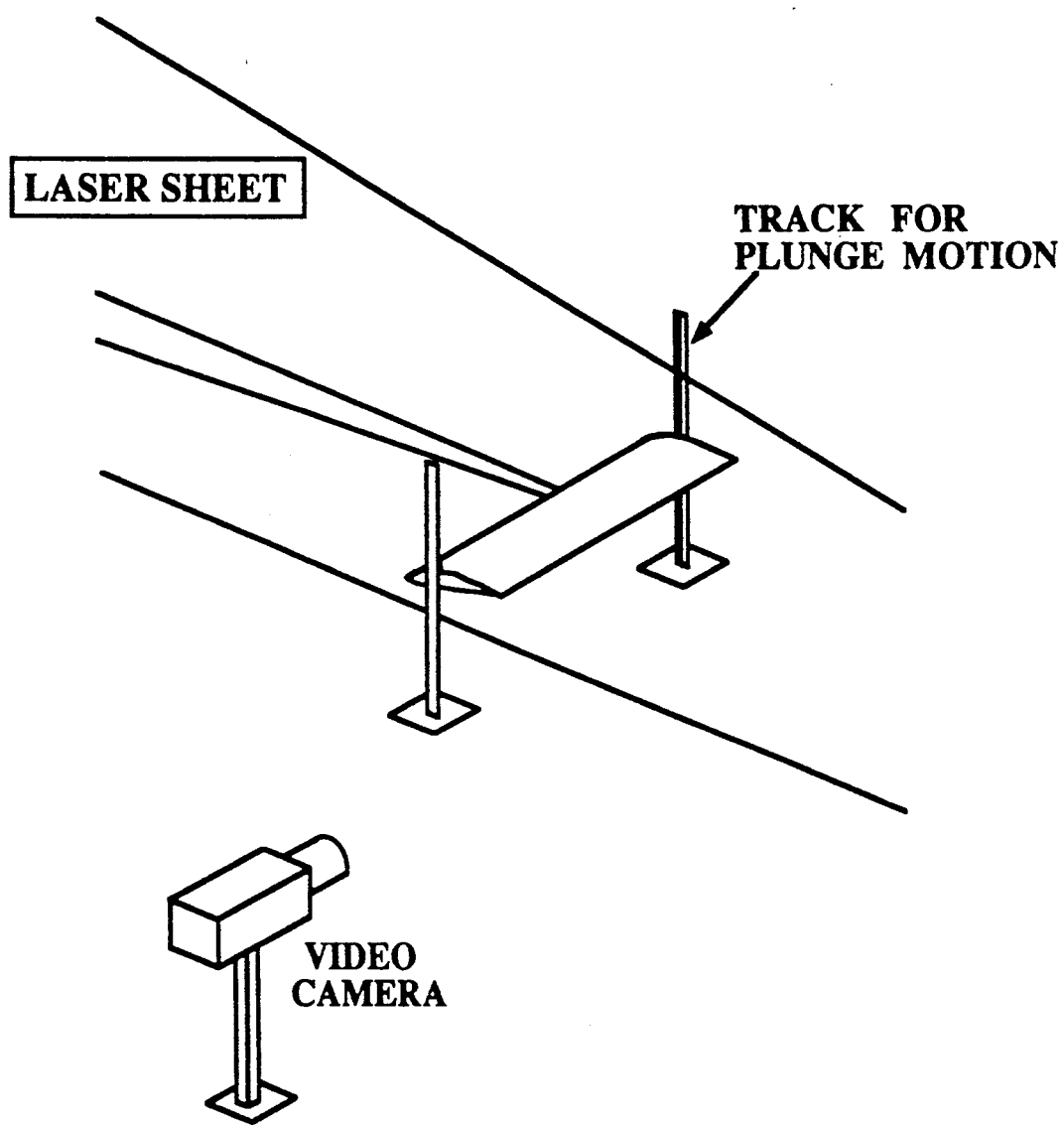
FIG. 12: Arrangement for SCV around a wing in a 2.14 m×2.74 m wind tunnel.

The experimental setup is shown in FIG. 12. The seeding was provided by 3 smoke-wires. A section of the wind tunnel flow was illuminated by a copper vapor laser sheet. A video camera with a 0.001 second shutter was used to record the flow patterns in the laser sheet. The camera was typically located at 1.7 meters from the plane of interest.

Steady wing at zero degrees angle of attack

The first experiments measured the flow around a wing at a steady angle of attack. The wing had a constant, untwisted NACA 0012 section with a chord of 234 mm and a span of 1067 mm. The airfoil was set at zero angle of attack. The velocity pattern was successfully captured.

Plunging Airfoil

Figure 13:
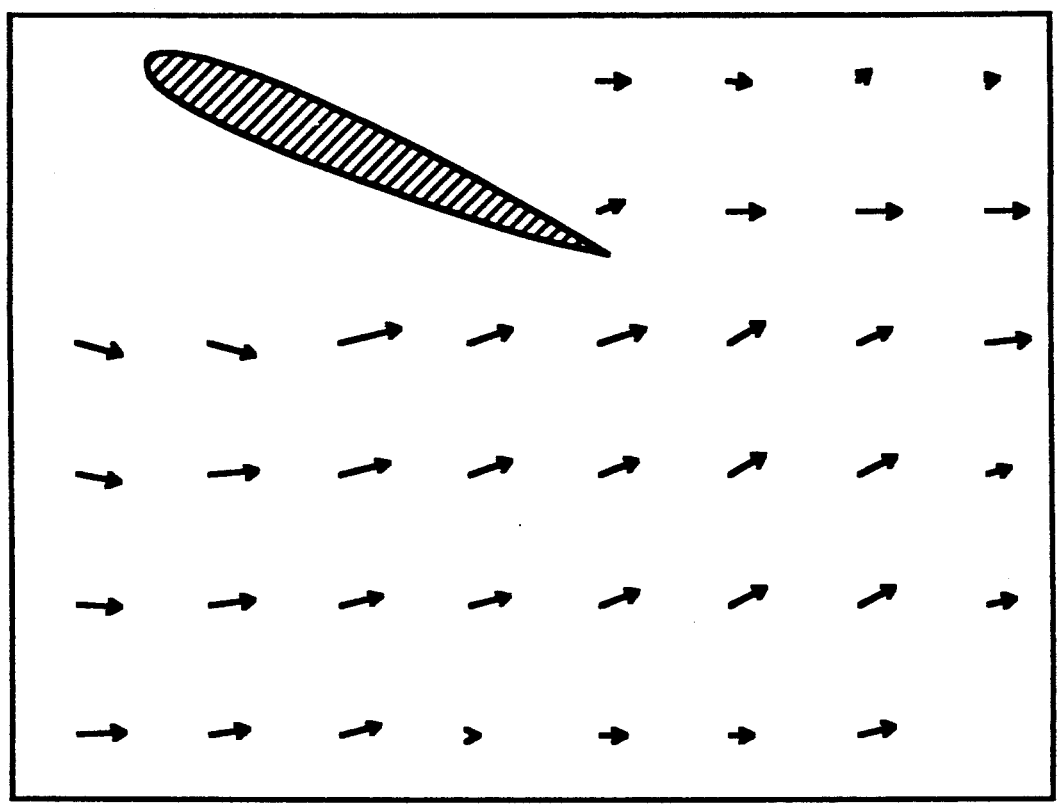
FIGS. 13(a)–13(c): Sequence of instantaneous velocity plots around the wing in plunging motion.
Figure 13:
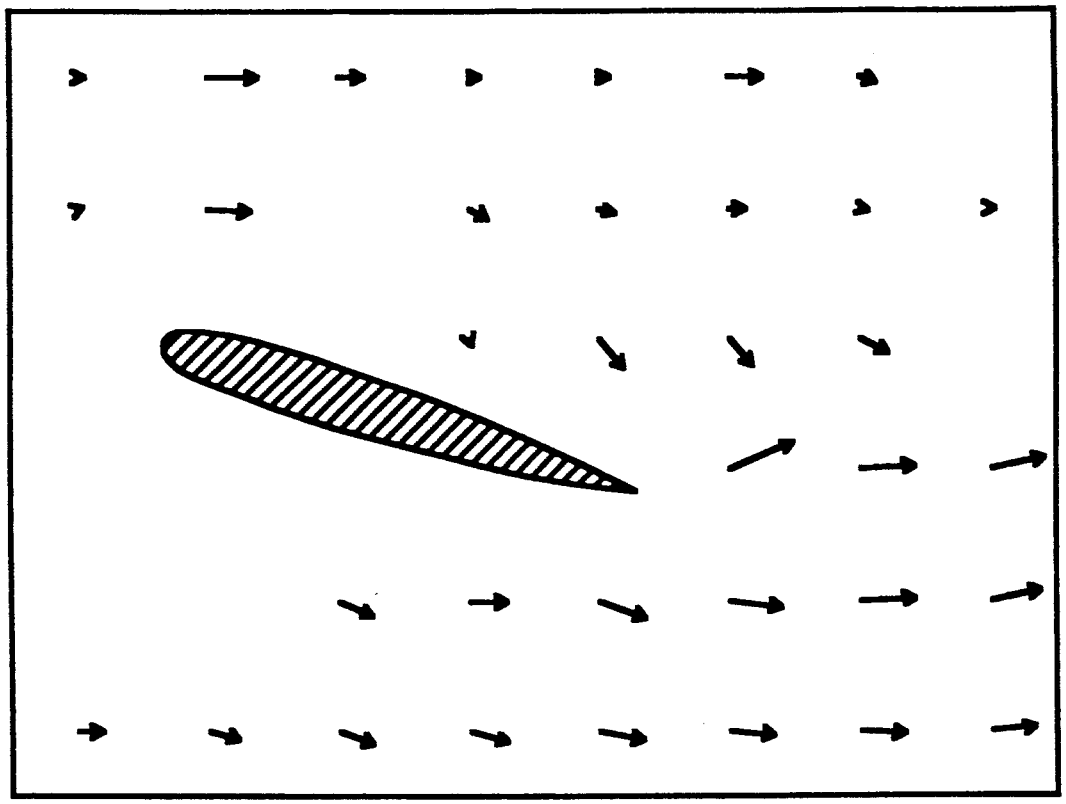
Figure 13:
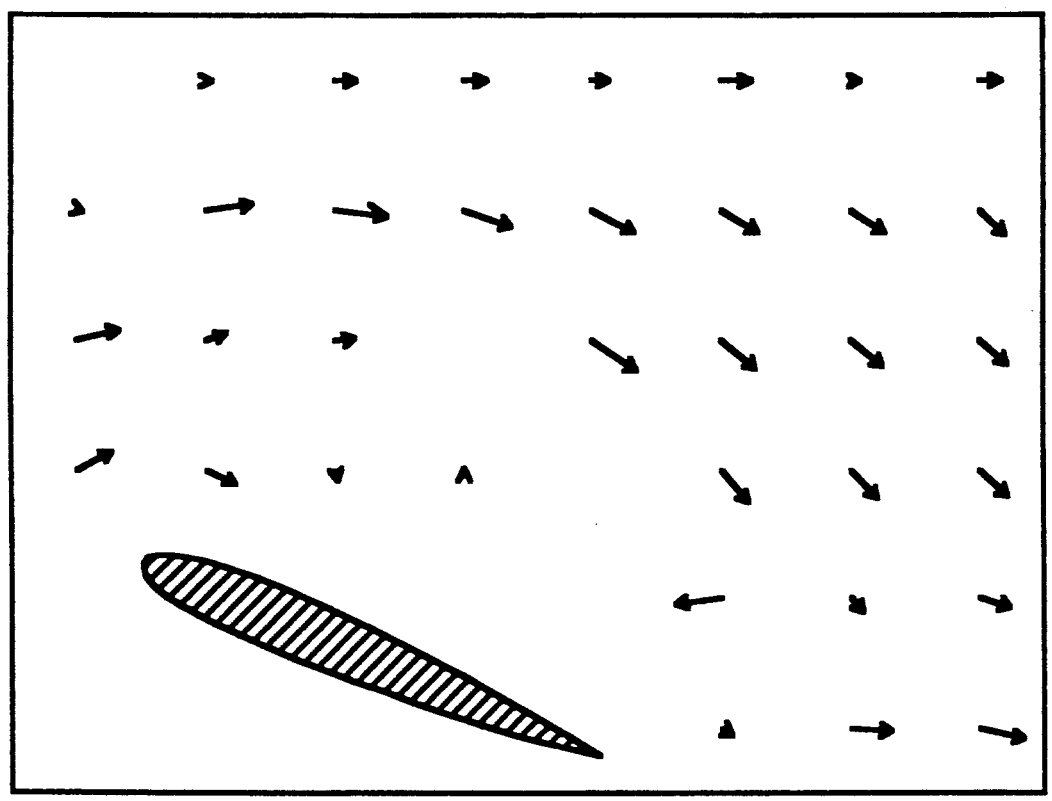

The experiments discussed so far have been cases where the velocity field can, in principle, be obtained by other means, although at far greater expense of facility time and effort. The truly unique capabilities of the SCV technique, however, become apparent when dealing with flows that are totally unsteady. The NACA0012 wing was put into a vertical translation motion in which both the angle of attack and the translation speed varied over time. The vertical distance covered during one cycle of the motion was 362 mm. The freestream tunnel velocity for the experiment was 1.087 m/s and the reduced frequency of the plunge motion was 0.669. FIG. 13 represents examples from the time history of the velocity field during the plunging motion.

The reference velocity vector shown at the bottom of the first part of FIG. 13 is applicable to all the vector plots. All of the plots in FIG. 13 were obtained using a single pass technique; no overlapping or averaging was used. In this experiment, no closed-form calibration can be attempted, since SCV is absolutely alone in being able to perform this demonstration. The vector plots show reasonable flow patterns.

The reader will see that SCV enables simultaneous measurement of two components of velocity at a large number of points in a plane. While still at an early stage of development, its capabilities already outstrip those of techniques on which many researcher-years and many millions of dollars have been expended.

a) The flowfield areas where we have applied the technique are already far larger than the largest areas used in PIV or other existing techniques.
b) The technique works in lightly-seeded flows, such as those around the plunging wing, as well as in heavily-seeded flows, such as the incense smoke plume.
c) We need only ordinary lighting on liquid and solid surfaces. Individual particles need not be resolved.
d) There is no ambiguity in the sign of the velocity vector.
e) The light source and the camera can be placed relatively far away from the measurement plane.
f) With the exception of the copper vapor laser, which is a 30-watt pulsed laser which we use for flow visualization, all of the other components used to-date are common and inexpensive. Their combination in the SCV technique is novel and unique.
g) The post-processing is automatic, unlike in the PIV and Laser Speckle techniques. We have obtained all of the results shown in this application using a Macintosh II TM personal computer.
h) The only other technique which can measure the velocity field of the plunging wing is LDV, and that would take months of wind tunnel operation to obtain the same number of velocity vectors, one point at a time. Even then, LDV measurements would require the use of perfectly-periodic wing motion, so that phase-averaging can be performed. Using SCV, the plunging-wing experiment was completed in half an afternoon, including set-up, operation, and dismantling.

We have thus invented a technique which converts velocity measurement from a facility-intensive and laborious process to one which requires only minutes of facility operation. The processing required for SCV can be performed even on personal computers. We have demonstrated implementations of this invention for applications to solid surfaces, liquid surfaces, and rapidly-moving gas flows. These are but preliminary examples of the scope of this invention.

Best Conceived Mode of Operation

For large wind tunnels, or high-speed wind tunnels, where the cost of operation time is several thousands of dollars per hour, we propose a system comprising a high-speed large-array camera, a parallel image-transmission system to enable high rates of data transfer, and a parallel-processing computer for high-speed data analysis. The lighting could be provided by one or more powerful lasers, which could be oriented in different planes to get several planes of data simultaneously. Using an image-intensified framing camera, the seeding requirements can be reduced to minimal levels. The technique will also work with other forms of radiation, such as laser-induced fluorescence signals from the flow and with images formed by refractive index gradients. The use of multiple cameras will enable simultaneous imaging of several planes, and/or acquisition of a sequence of images in rapid succession to form a detailed time history of the velocity field. The use of the high-speed computer will enable rapid turn-around of results, as well as detailed, iterative extraction of various features of the data, and sophisticated error-checking.

The invention claimed is:

1. A method of measuring velocities at a plurality of locations in a moving medium exhibiting imagable inhomogeneities that move with the medium, said method comprising the steps of:
    (a) obtaining a first image of the inhomogeneities within a predetermined area of the medium;
    (b) obtaining a second image of the inhomogeneities within the predetermined area of the medium with the second image being obtained within a time period sufficiently short to insure that substantially all of the inhomogeneities captured within the first image are present in the second image;
    (c) digitizing the information contained in the first and second images obtained in steps (a) and (b);
    (d) constructing a first numerical array representative of the digitized information produced in step (c) for the first image;
    (e) constructing a second numerical array representative of the digitized information produced in step (c) for the second image;
    (f) partitioning each of the first and second numerical arrays into a plurality of sub-arrays with each sub-array corresponding to one of the plurality of locations in the moving medium for which the velocity is to be measured;
    (g) determining the cross-correlation matrix between each sub-array of the first numerical array and the corresponding sub-array of the second numerical array;
    (h) identifying the extreme value within each of the cross-correlation matrices determined in step (g);
    (i) for each cross-correlation matrix from step (g), determining the vector corresponding to the displacement within the matrix of the extreme value from the position corresponding to no displacement;
    (j) converting each vector determined in step (i) to a vector having units of spacial displacement; and
    (k) applying the known time between the first image and the second image to convert each displacement vector to a corresponding velocity vector.

2. The method of claim 1 and wherein steps (a) and (b) comprise projecting a sheet of light through the moving medium to illuminate the inhomogeneities within a substantially planar section of the medium and recording an image of a predetermined area of the illuminated planar section.

3. The method of claim 2 and wherein the step of recording an image of a predetermined area of the illuminated planar section comprises capturing the image on video tape.

4. The method of claim 2 and wherein the step of recording an image of a predetermined area of the illuminated planar section comprises capturing the image on film.

5. The method of claim 1 and wherein the moving medium comprises a moving fluid.

6. The method of claim 5 and wherein the inhomogeneities exhibited by the moving fluid comprise particulate matter within the fluid with the particulate matter forming patterns that move with the fluid.

7. The method of claim 5 and wherein the inhomogeneities exhibited by the moving fluid comprise density gradients within the fluid that move with the fluid.

8. The method of claim 1 and wherein the moving medium is a solid surface and wherein the inhomogeneities comprise imagable features on the surface.

9. The method of claim 1 and wherein the inhomogeneities within the medium are formed by a multitude of particles in the medium with the individual particles themselves being too small to be imaged in steps (a) and (b).

10. A method of determining selected dynamics within a preselected substantially planar region of a fluid flow comprising the steps of:
    (a) inducing within the flow patterns that emulate the movement of fluid within the flow;
    (b) obtaining a first image of the patterns within the preselected substantially planar region of the flow;
    (c) delaying for a time sufficient to allow the patterns within the preselected substantially planar region to shift with the moving fluid by a predetermined amount;
    (d) obtaining a second image of the patterns within the preselected substantially planar region of the flow;
    (e) digitizing the first image to generate a first numerical matrix with the elements of the first matrix being indicative of a predetermined characteristic of the imaged patterns;
    (f) digitizing the second image to generate a second numerical matrix with the elements of the second matrix being indicative of the predetermined characteristic of the imaged patterns;
    (g) calculating the cross-correlation between the second numerical matrix and the first numerical matrix;
    (h) identifying the location of the extreme value of the cross-correlation; and
    (i) mathematically converting the identified location of the extreme value to units of the selected dynamics to be determined.

11. The method of claim 10 and wherein steps (e) and (f) further comprise subdividing the first and second numerical matrices into sub-matrices and performing the remaining steps of the method on each sub-matrix to determine the selected dynamics for each sub-matrix and thus for a plurality of locations within the preselected substantially planar region of the fluid flow.

12. The method of claim 10 and wherein at least one of the selected dynamics is displacement and wherein step (i) comprises determining the shift in location of the extreme value from a predetermined reference location in the cross-correlation and converting the shift to units of spacial displacement from the first image to the second image.

13. The method of claim 11 and wherein at least one of the selected dynamics is velocity and wherein step (i) further comprises applying the known delay time between the first and second images to convert the displacement into units of velocity.

14. The method of claim 10 and wherein step (a) comprises seeding the flow with a multitude of particles that are carried by the flow and that together form the patterns that emulate the movement of fluid within the flow.

15. The method of claim 10 and wherein steps (g) through (i) are performed by an appropriately programmed computer.

16. The method of claim 10 and wherein steps (e) and (f) the predetermined characteristic is the intensity of the image at the locations corresponding to each element of the image.

17. An apparatus for determining selected dynamics within a preselected substantially planar region of a fluid flow comprising the steps of:
   means for inducing within the flow patterns that emulate the movement of fluid within the flow;
   means for obtaining a first image of the patterns within the preselected substantially planar region of the flow;
   means for inducing a delay for a time sufficient to allow the patterns within the preselected substantially region to shift with the moving fluid by a predetermined amount;
   means for obtaining a second image of the patterns within the preselected substantially planar region of the flow;
   means for digitizing the first image to generate a first numerical matrix with the elements of the first matrix being indicative of a predetermined characteristic of the imaged patterns;
   means for digitizing the second image to generate a second numerical matrix with the elements of the second matrix being indicative of the predetermined characteristic of the imaged patterns;
   means for calculating the cross-correlation between the second numerical matrix and the first numerical matrix;
   means for identifying the location of the extreme value of the cross-correlation; and
   means for mathematically converting the identified location of the extreme value to units of the selected dynamics to be determined.

18. The apparatus of claim 16 and wherein said means for obtaining first and second images of the patterns within the preselected substantially planar region of the flow comprises a video camera.

19. The apparatus of claim 16 and wherein said means for digitizing comprises an electronic digitizing board.

* * * * *